(12) United States Patent
Lee et al.

(10) Patent No.: US 7,488,516 B2
(45) Date of Patent: Feb. 10, 2009

(54) METHOD FOR MODIFICATION OF GLASS-BASED MICROCHANNEL

(75) Inventors: Gwo Bin Lee, Tainan (TW); Che Hsin Lin, Tainan County (TW); Shu Hui Chen, Tainan (TW)

(73) Assignee: National Cheng Kung University, Tainan (TW)

( * ) Notice: Subject to any disclaimer, the term of this patent is extended or adjusted under 35 U.S.C. 154(b) by 793 days.

(21) Appl. No.: 10/759,059

(22) Filed: Jan. 20, 2004

(65) Prior Publication Data

US 2004/0146652 A1    Jul. 29, 2004

(30) Foreign Application Priority Data

Jan. 21, 2003    (TW) .............................. 92101228 A

(51) Int. Cl.
*B05D 5/12* (2006.01)
(52) U.S. Cl. ..................................... 427/376.2; 427/240
(58) Field of Classification Search .................. 427/387
See application file for complete search history.

(56) References Cited

U.S. PATENT DOCUMENTS

| | | | | |
|---|---|---|---|---|
| 5,074,982 A | * | 12/1991 | Novotny et al. | ............. 204/454 |
| 5,110,439 A | * | 5/1992 | Holloway | ................... 204/605 |
| 5,286,675 A | * | 2/1994 | Chen et al. | .................. 438/624 |
| 6,132,814 A | * | 10/2000 | Livesay et al. | .............. 438/787 |
| 6,326,083 B1 | * | 12/2001 | Yang et al. | ................... 428/429 |
| 6,766,817 B2 | | 7/2004 | Da Silva | |

OTHER PUBLICATIONS

Chua, C.T., Sarkar, G., and Hu, X., "In Situ Characterization of Methylsilsesquioxane Curing," Journal of the Electrochemical Society, 145 (11) : 4007-4011, Nov. 1998.*

* cited by examiner

*Primary Examiner*—Timothy H Meeks
*Assistant Examiner*—Robert Vetere
(74) *Attorney, Agent, or Firm*—Bacon & Thomas, PLLC

(57) ABSTRACT

A method for modification of glass-based microchannels, which uses liquid organic-based solution containing siloxane for the modification of microchannels on the glass substrate, such as quartz, boron glass, sodium glass, and the like, to form a solid film to isolate the glass surface of the microchannels from the environment. Therefore, the present invention can be applied for electrophoresis experiment, so that the operation causes no electrical-double-layer effects, and further eliminates the occurrence of electro-osmosis flow, thus the separation efficiency of electrophoresis chips is improved.

20 Claims, 4 Drawing Sheets

METHOD FOR MODIFICATION OF GLASS-BASED MICROCHANNEL

BACKGROUND OF THE INVENTION

1. Field of the Invention

The present invention relates to a method for modification of glass-based microchannels. It can be applied to various electrophoresis separation devices without occurrence of electro-osmosis flow effect during the material detection such as DNA, protein, anions, cations and the like.

2. Description of the Related Art

The capillary electrophoresis has been widely applied in all kinds of biochemical analysis domain for having advantages such as short separation time, less sample injection volume, high sensitivity, and convenient instrument operation. Recently, the capillary electrophoresis is further widely used in biological samples, such as protein and DNA, or chemistry-based analysis research. In 1981, Jorgenson et al. [1] used the capillary having inner diameter of 75 μm to separate the amino acid and detect fluorescence signals. This method became the basic structure of current capillary electrophoresis analysis technique. Because this method provided the advantages not found in the traditional system, it was widely utilized and developed. In recent years, following the development of micro-electro-mechanical-system (MEMS) technique, there presents various micro-fluid biomedical detection chips produced by the MEMS process. In 1992, Harrison et al. [2] employed the MEMS techniques to fabricate planar microchannels in glass for conducting the electrophoresis on capillary chip, which was associated with the optical detection system to successfully separate the samples on the glass micro-fluidic chip. Not only could this technique greatly reduce the separation time, but it also reduces the sample usage and the analysis cost.

However, the main material for the substrate of the conventional glass capillary or producing planar microchannels is the fused silica, wherein the Si—OH on the surface is easily dissociated to form the Si—O⁻ with negative charges. Thus, when the capillary is full of the buffer solution, it will form the electro-double-layer (EDL), wherein the first layer is a stern layer formed by attaching with positive material in the solution attracted by the negative Si—O⁻ on the capillary wall; and, the second charged layer is formed by superfluous positive material attracted simultaneously at farther location on the capillary wall, and the charge density is decreased in an exponential trend with the increased distance from the capillary wall to form the diffusion layer. Due to the existence of the EDL, it will induce the Zeta potential between the capillary wall and the operation solution. Under the effect of the electrical field, the solution in the capillary will flow entirely, so as to generate the bulk motion of electro-osmosis flow (EOF), which is characterized in that the fluid velocity in the microchannel is uniformly distributed, but not the parabolic distribution for the conventional pressure-driven pipe flow. The mobility of the electro-osmosis flow for the solution in a uniform electric field is given as the formula below:

$$\mu_{eo} = \frac{\varepsilon \zeta}{\eta},$$

wherein,
$\mu_{eo}$: mobility of electro-osmosis flow in the solution
$\varepsilon$: dielectric constant of the solution
$\zeta$: interface potential (Zeta potential)
$\eta$: viscosity of the solution.

On the other hand, in the capillary electrophoresis, because the charged particles have their own electrical electrophoresis mobility $\mu_{ep}$, and the solution itself also has the electro-osmosis flow mobility $\mu_{eo}$, the actually observed overall mobility $\mu_{ap}$ is the sum of both values.

$$\mu_{ap} = \mu_{eo} + \mu_{ep}$$

The positive ions are attracted by the negative electrodes, and also with the electro-osmosis flow speed to cause the materials with positive charges to move faster ($\mu_{eo}$ and $\mu_{ep}$ have the same direction), and the materials with negative charges are repulsive with the negative electrodes (cathodes) and moving in a lower speed ($\mu_{eo}$ and $\mu_{ep}$ have the opposite directions). The moving speed of neutral ions equals to the electro-osmosis flow. Thus, if it is the electro-osmosis flow in the system that channels the flow of the separating material, the separation efficiency would be undesirable, or even not able to separate samples. Because the $\mu_{eo}$ and $\mu_{ep}$ move in opposite directions, the material led by the electrophoresis will be brought back to the original place by the electro-osmosis flow. It can be noted that to restrain the occurrence of electro-osmosis flow becomes the key point for achieving higher or lower separation efficiency in many applications.

The method for insulating the glass surface from the operational solution by glass surface modification had been disclosed by Hjertén [3] in 1967, which used the chemical treatment to generate the covalent bonding for the —OH functional group on glass surface with silane, and cover the glass substrate with the bonded organic molecules. This method had been widely utilized. Yet in 1985, Hjertén disclosed a method of using linear polyacrylamide for the modification on the inner wall of glass capillary [4]. After this technique had been applied in the protein separation, numerous researches were conducted by using the same method for the surface modification of glass capillary for proteins, DNA or polypeptides researches. Furthermore, all kinds of different modification methods have been continuously disclosed, such as using Si—OH group on the glass surface for silanization being one of the major methods for modification [5-7]. Moreover, Schomburg et al. [8] used a series of polarized organic molecules having —NH₂ group to form the covalent bonded hydrophilic molecular film on the glass surface for reducing the electro-osmosis effect on the glass surface. Furthermore, another major system uses the polyvinyl alcohol (PVA) organic molecule for forming covalent bonds with Si—O—Si chemical bonds in the glass to isolate from the glass substrate [9-10]; or, using esterization [11], or thionyl chloride and magnesium bromide to react with the glass surface [12]; or, using polyacrylamide [13], or poly(glycidyl mechacrylate) (PGMA) to form the covalent bonds with the Si—OH group on the glass surface [14] to achieve the modification. A similar method disclosed by Lwinweber in 2001 used poly(2-hydroxyethyl methacrylate) (PHEMA) organic polymer [15] to conduct the modification on capillary wall and verify the performance. Lately, U.S. Pat. No. 6,375,818 B1 disclosed using poly(vinylpyrrolidone) organic polymer for the modification of capillary [16].

The conventional glass modification methods all used organic compounds to react with the functional groups on glass surface for chemical reactions. Although these methods had been verified, there are still lots of problems needed to be solved. For example, the above-mentioned methods all need long-time chemical reactions, because the processing steps are processed one by one, thus rendering these methods unable to mass production. Therefore, tremendous amount of time would be wasted, a result that is not economically efficient. Furthermore, most of the glass surfaces have to keep moist after modification; otherwise the processed layer will be ineffective due to drying. This feature makes the capillary hard to be preserved after processing, or cost has to be spent for preservation, so as to limit the availability of commercialization. Moreover, because these methods use the Si—OH groups on the glass surface for chemical bonding, the methods are available for processing the pure silica glass, such as crystal or fused silica, but problems would be caused while processing sodium glass containing complex components. Because the sodium glass contains $Na_2O$ (13.7%), CaO (8.8%) and MgO (4.0%), components that are difficult to conduct chemical reaction with the added organic molecules. Thus, using these methods for modification might cause undesirable processing efficiency.

SUMMARY OF THE INVENTION

Owing to the various disadvantages in the related art, the present invention provides a method for modification on the surface of glass substrate comprising the following steps: forming a film by coating liquid organic-based solution on the surface of glass substrate; applying heat treatment on the substrate coated with the organic-based solution to cross-link and solidify the coating layer; and completing the modification process according to the present invention.

The glass substrate can be quartz, boron glass, sodium glass or other glass material. Other materials including silicon, silicon based materials, metal and ceramics could be used.

The method is preferably applied for the modification of glass-based microchannels (such as microchannels on microfluidic chips) comprising the following steps: filling the liquid organic-based solution in the glass microchannels; removing the superfluous organic-based liquid; and, applying heat treatment for the glass microchannels covering with organic-based solution to cross-link the liquid materials.

The organic-based solution is preferably the organic-based spin-on-glass (organic-based SOG), wherein the chemical component is mostly the organic polymer, such as siloxane or silsesquioxane.

The step of heat treatment is to bake the glass microchannels covering with polymer in a high temperature furnace under the appropriate temperature for a proper period of time. The foregoing temperature is preferably at 425° C.

The step of heat treatment can be conducted directly in a normal atmosphere to achieve excellent effect. More preferably, it can further fill the inert gas, such as nitrogen, argon, neon, and the like, in the high temperature furnace to conduct the heat treatment in the inert gas atmosphere.

After the cross-link and solidification of organic-based SOG, it will have two functional groups side links $R_1$ and $R_2$, wherein $R_1$ and $R_2$ can be the functional groups, like H, $CH_3$, $CH_3CH_2$, $CH_3CH_2CH_2$, $C_6H_5$, $CF_3CH_2CH_2$, and the like, or other derivative organic functional groups.

The present invention uses a method for modification on microchannel surface of glass substrate in a simple, fast and batch process, which eliminates the complex and time-consuming chemical processing steps, like silanization, esterization, and uses the spin-on-glass (SOG) in a conventional semiconductor processing for modification. The modification possesses the combination of physical and chemical properties, so that it can use any kinds of glass substrates, even material other than glass substrate such as silicon, metal or ceramics. Moreover, the present invention does not include complex and time-consuming chemical reaction processes, so that it can greatly reduce the processing steps, and can conduct microchannels mass production to improve the productivity. The substrate after processing can also be preserved in the air, so that, without special preservation environment, it can preserve the features for months to reduce the preservation cost. The method according to the present invention can provide a complete solution for the modification of microchannels for various glass substrates.

DETAILED DESCRIPTION OF THE PREFERRED EMBODIMENTS

Figure 1:
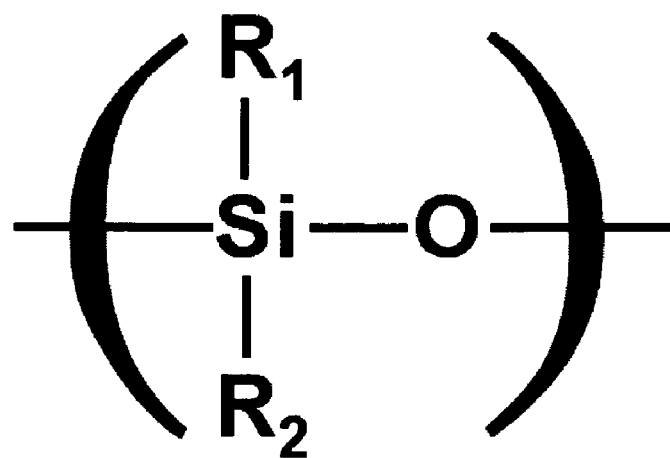
FIG. 1 is a chemical formula for siloxane organic spin-on-glass after cross-linking and solidification.
Figure 2:
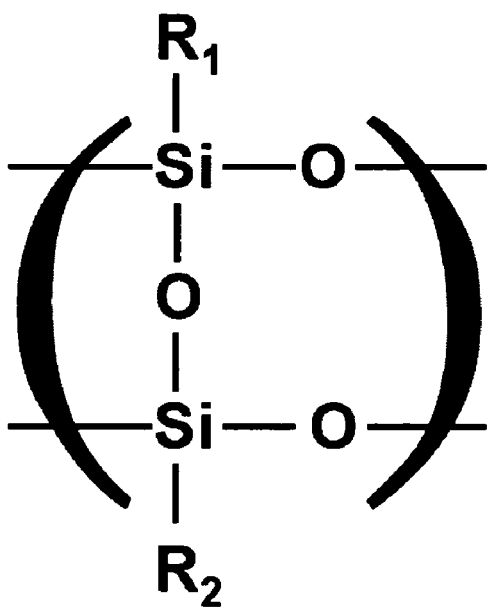
FIG. 2 is a chemical formula for silsesquioxane organic spin-on-glass after cross-linking and solidification.

The spin-on-glass (SOG) used for the modification on the surface of glass microchannels according to the present invention is an organic-based SOG with the chemical components mostly the organic polymer, such as siloxane or silsesquioxane, and the chemical formula after cross-link polymerization as shown in FIG. 1 and FIG. 2. The SOG before cross-linking is a colorless and transparent liquid with low viscosity, which will form an extremely thin and colorless layer after heating and cross-linking with the thickness at about 1,000-3,000 Å depending on the types of SOG. The present invention can effectively isolate the Si—OH group on the surface of glass substrates (such as quartz, boron glass, sodium glass, or other glass material) from the environment. In addition, because the chemical functional groups exposed to the environment after cross-linking are the organic molecular groups, it can greatly reduce the electro-double-layer (EDL) effect, and restrain the occurrence of electro-osmosis flow.

The operation of spin-on-glass (SOG) according to the present invention is extremely simple, which mainly includes the following steps:

a. Filling of Organic-Based SOG:

The SOG solution can be filled up in all the space of glass microchannels by the capillary force; then, sucking out the superfluous SOG by vacuum suction; and, the SOG solution can form a thin layer on the surface of glass microchannels;

b. Heat Treatment:

The glass microchannels after the step a are placed in a high temperature furnace with nitrogen environment (or under normal atmosphere) at 425° C. for one hour, to complete the modification procedure for SOG. The mechanism of cross-linking and solidification for SOG is to form the Si—O—Si covalent bonding by the Si—OH group in SOG monomer with another Si—OH group by removing one water molecule in high temperature, so that it can react with the Si—OH group on the glass surface, or react with the Si—OH group in the neighboring SOG molecule. Thus, the SOG film has the chemical covalent bonding with the glass substrate to increase the attaching force. Moreover, the $R_1$ and $R_2$ organic molecule groups bonded with Si atom (as shown in FIG. 1) have excellent chemical stability, which is not easily oxidized (wherein $R_1$ and $R_2$ may be the functional groups, like H, $CH_3$, $CH_3CH_2$, $CH_3CH_2CH_2$, $C_6H_5$, $CF_3CH_2CH_2$, and the like, or other derivative organic functional groups.) Therefore, the surface after processing can be preserved in the air for months, but still possess the desired features, and the organic functional groups exposed on the surface will not be reacted with most kinds of acid and alkaline solutions. Therefore, the glass microchannels after modification according to the present invention can be cleaned by the acid or alkaline solutions without influencing the chemical component on the surface, which is convenient for operations in the laboratory.

The advantages and performances provided by the method of modification for glass microchannels according to the present invention are further described with the following examples.

EXAMPLE 1

Figure 3:
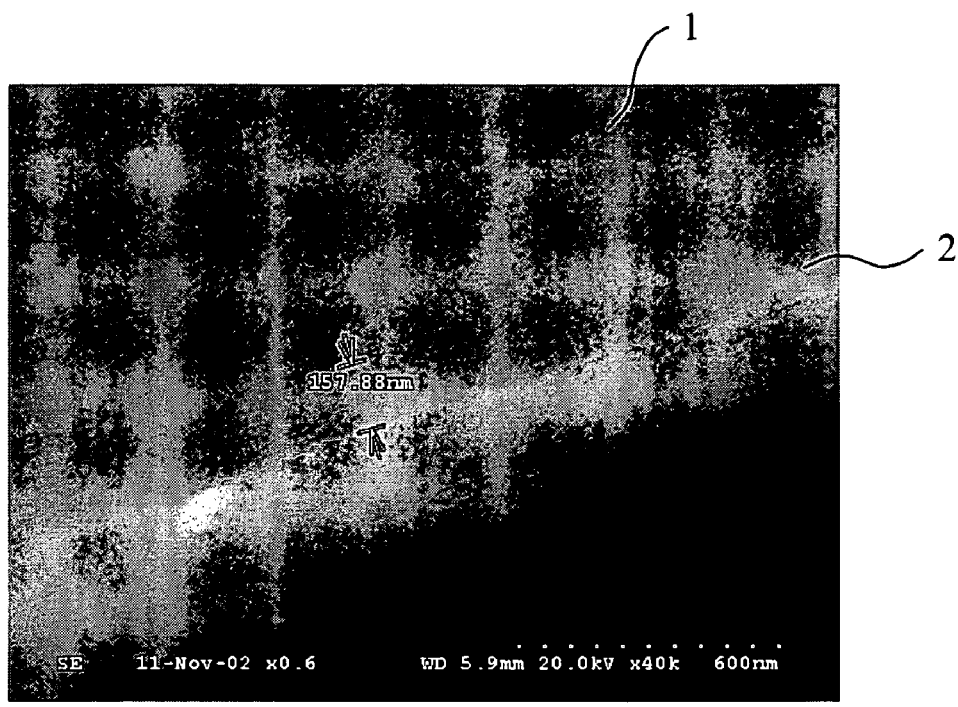
FIG. 3 is a cross-sectional image from scanning electron microscope (SEM) for the organic-based spin-on-glass after solidification and cross-linking.

This example is to conduct the above-mentioned modification step, wherein the SOG uses a commercialized organic-based spin-on-glass (silsesquioxane series). After modification on glass microchannels, the cross-section for the microchannels from the scanning electron microscope is shown in FIG. 3. The amplification of the image is 40,000 times. The grain material on the upper half of the figure is the grain of the glass substrate 1, and the middle is an SOG film 2 with a thickness of about 158 nm. From the FIG. 3, the SOG film can completely cover the glass substrate 1 to isolate the chemical structure of glass surface from the environment, so that it can effectively restrain the occurrence of electro-osmosis flow. Moreover, the surface of SOG film after cross-linking and solidification provides excellent smoothness, and the smooth surface of the mircochannel is beneficial to the desirable separation efficiency of electrophoresis separation for the chip.

EXAMPLE 2

Figure 4:
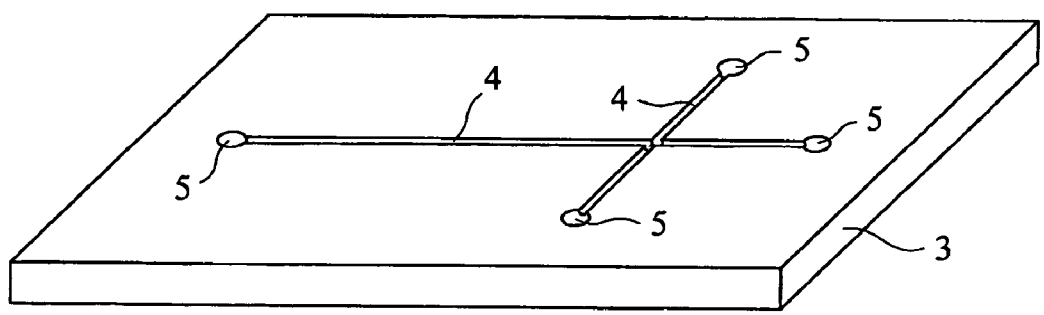
FIG. 4 is a diagram for cross-type micro-electrophoresis chips.
Figure 5:
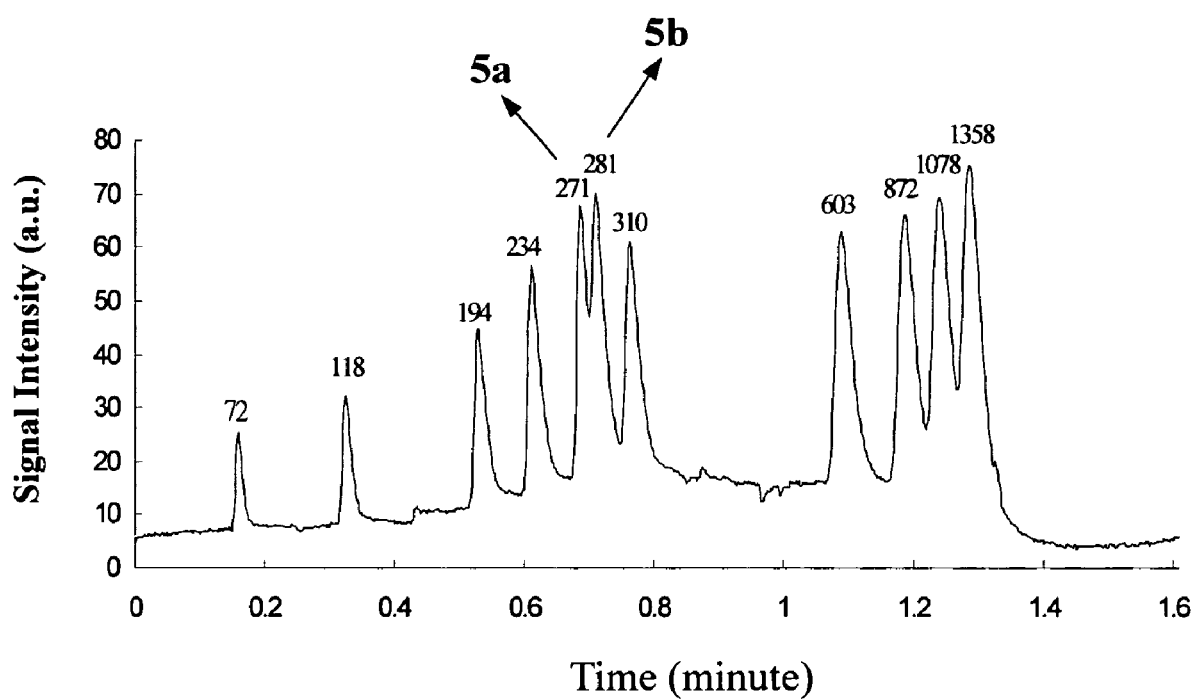
FIG. 5 is an electrophoregram obtained by separating HaeIII digested Φ X-174 DNA segments from the cross-type micro-electrophoresis chips after modification by the method according to the present invention.

This example is to apply the method of modification for glass microchannels according to the present invention to a cross-type electrophoresis chip 3, as shown in FIG. 4, wherein the microchannels 4 have the depth of 40 μm, the width of 100 μm, the length for separation channel of 40 mm. The chip is configured with four holes 5 for the liquid to flow in and out. The sample for this example is a ΦX-174 DNA segment decomposed from Hae III restriction enzyme with the concentration of 500 ng/μL. The electrophoresis buffer solution during operation is TBE (tetra-borate-EDTA), which is added with 1.2% of HPMC (hydroxypropylmethel cellulose) as the molecule filter and added with 1% of Yopro-1 fluorescent dye for reaction with DNA samples. The injection voltage for the operation samples is 0.4 kV, and the injection time is 30 seconds. The separation voltage is set at 1.2 kV, and the separation time is 2 minutes. The diagram for the electrophoresis separation result is shown in FIG. 5. From the figure, the 11 segments of Φ X-174 DNA can all be separated on the surface modified chip, and the separation effect is excellent. Even the two segments 5a and 5b not easily be separated (two signal peaks of 271 and 281 base pairs) using the conventional methods, which can still be effectively separated in this example. On the contrary, if using the glass chip without the modification for the same experiment, no signal can be obtained. It can thus be ascertained that using the method of modification for glass microchannels according to the present invention can effectively restrain the occurrence of electro-osmosis flow, and provide excellent separation efficiency for separating DNA samples.

EXAMPLE 3

Figure 6:
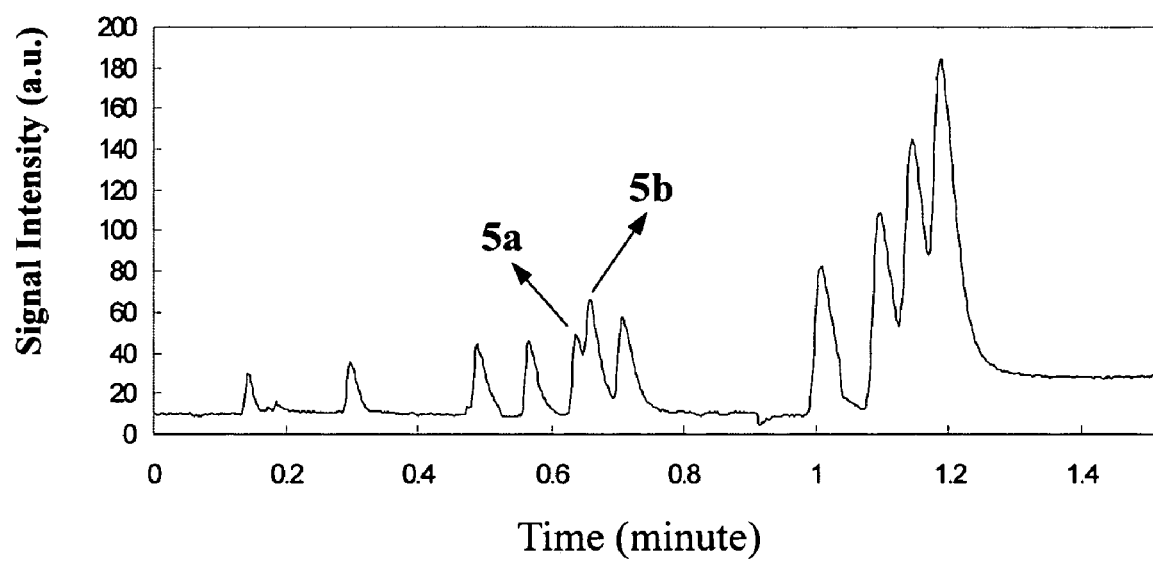
FIG. 6 is an electrophoregram obtained by separating HaeIII digested Φ X-174 DNA segments from the chips preserved in the air for 45 days after modification by the method according to the present invention.

In order to prove that the glass chip after processing according to the present invention only needs to be preserved in the air, the present invention put a chip after modification into a sealed bag for 45 days, and then took out and rinsed with 1N of HCl and 1N NaOH solution for 5 minutes, respectively, and rinsed with de-ionized water for extra 5 minutes. Then, with the same operation conditions as in Example 2, it again conducts the separation tests for ΦX-174 DNA, and the separation result is shown in FIG. 6. It can be proved that the chip after modification can be preserved in the air for 45 days with the processing according to the present invention, and features thereof can still be maintained after modification. And, after rinsing with cleaning solution HCl and NaOH frequently used for the capillary electrophoresis, excellent separation result can still be maintained. Thus, the method of modification according to the present invention can resist the erosion of general acid and alkaline solutions without changing the chemical features for the surface, so that it can greatly reduce the preservation cost for the chip.

In conclusion, the present invention provides a method for modification on microchannels for glass substrate, which is different from the conventional chemical method of using silanization to form the covalent bonding for the Si—OH group on glass surface with the silane or poly-vinyl-alcohol compounds to achieve the modification purpose. On the contrary, the present invention uses an organic-based spin-on-glass (SOG) to attach a layer of organic polymer film on the surface of glass microchannels, and isolate the molecules on glass surface from the solution in the channel to restrain the occurrence of electrical-double-layer effect, so as to restrain the occurrence of electro-osmosis flow. Not only can this method greatly reduce the time and cost for the modification of glass substrate, but it also processes large amount of glass substrates at the same time, therefore, it can increase the production performance and reduce fabrication cost. Furthermore, the chip after modification needs only to be preserved in a normal environment with room temperature and pressure, and the effective period can be as long as several months, so that it can reduce the preservation cost. Moreover, the modified chip has excellent chemical stability, and it can be used in all kinds of acid and alkaline environment without being degraded. It can be noted from the above-mentioned advantages that, the present invention provides a solution for the modification process for glass substrates, and also an important technique for commercialization of glass micro-fluidic detection systems.

REFERENCES

1. J. W. Jorgenson, K. D. Lukacs, "Zone electrophoresis in open-tubular glass capillaries", Anal. Chem., 53, pp.1298-1301 (1981).
2. D. J. Harrison, A. Manz, Z. Fan, H. Ludi, "Capillary electrophoresis and sample injection systems integrated on a planar glass chip", Anal. Chem., 64, pp. 1926-1932 (1992).
3. S. Hjertén, "Free zone electrophoresis" Chromatogra. Rev. 9, pp. 122-219, (1967).

4. S. Hjertén, "High Performance Electroohoresis: Eliminiation of Electroendosmosis and Solute Adsorption" Chromatogra. 347, pp. 191-198 (1985).
5. G. K. Echterling, J. E. Herweh, "Alkixysilane and alkoxysilane terminated polyamic or polyimide lacquer composition" U.S. Pat. No. 5,036,145, Jul. 30, (1991).
6. L. A. Colon, "Silica materials" U.S. Pat. No. 5,869,152, Feb. 9,(1999).
7. H. Yang, S. A. Sundberg, "Surface coating for microfluidic device that incorporate a biopolymer resistant moiety" U.S. Pat. No. 6,326,083, Dec. 4,(2001).
8. G. Schomburg, Martin Gilges, "Deactivation of the inner surfaces of capillaries" U.S. Pat. No. 5,502,169. Mar. 26, (1996).
9. M. Gilges, M. H. Kleemiss, G. Schomburg, "Capillary zone electrophoresis separations of basic and acidic proteins using poly(vinylalcohol) coatings in fused silica capillaries", Anal. Chem. 66, 2038, (1994).
10. B. L. Karger, W. Goetzinger, "Polyvinyl alcohol (PVA) based covalently bonded stable hydrophilic coating for capillary electroelectrophoresis", U.S. Pat. No. 5,840,388, Nov. 24, (1998).
11. B. Guidotti, W. Caseri, U. Suter, W. Saur, "Silicon or Silica substrate with a modified surface, process for producing the same, new orthoesters and process for producing the same", U.S. Pat. No. 5,709,715, Jan. 20, (1998).
12. V. Dolnik, D. Xu, A. Yadav, J. Bashkin, M. Marsh, O. Tu, E Mansfield, M Vainer, R Madabhushi, D Barker, D. Harris, "Wall Coating for DNA Sequencing and Fragment Analysis by Capillary Electrophoresis" J. Microcolumn separations, 10(2), pp. 175-184 (1998).
13. B. G. Belenkii, G. E. Kassalainen, D. G. Nasledov, "Modified capillary electrophoresis system for peptide, protein and double-stranded DNA analysis" J. Chromatography A, 879, pp. 189-196 (2000).
14. A. Cifuentes, P. Canalejas, J. C. Diez-Masa, "Preparation of linear polyacrylamide-coated capillaries study of the polymerization process and its effect on capillary electrophoresis performance" J. Chromatography A, 830, pp. 423-438 (1999).
15. F. C. Leinweber, J. Stein, M. Otto, "Capillary zone electrophoresis of proteins with poly(2-hydroxyethyl methacrylate)-coated capillary: fundamental and applications" Fresenius J. Anal. Chem., 370, pp. 781-788 (2001).
16. T. L. Huang, P. Reddy, "Surface with reduced electroosmotic flow" U.S. Pat. No. 6,375,818 B1, Apr. 23, (2002).

What is claimed is:

1. A method of modifying the surface of glass substrates, consisting essentially of the following steps:
    forming a film by coating the surface of glass substrates with a liquid organic-based solution selected from the group consisting of siloxane and silsesquiozane; and,
    applying heat treatment to the substrates coated with the organic-based solution to cross-link and solidify the liquid organic materials,
    wherein said liquid organic-based solution, after the heat treatment, isolates Si—OH groups on the surface of glass substrates from the environment to restrain the occurrence of electro-osmotic flow.

2. The method according to claim 1, wherein said liquid organic-based solution is an organic-based spin-on-glass.
3. The method according to claim 2, wherein said organic-based spin-on-glass has two side-linked functional groups $R_1$ and $R_2$ after cross-linking and solidification.
4. The method according to claim 3, wherein $R_1$ and R2 are independently selected from the group consisting of the functional groups of H, $CH_3$, $CH_3CH_2$, $CH_3CH_2CH_2$, $C_6H_5$, $CF_3CH_2CH_2$, and other derivative organic functional groups.
5. The method according to claim 1, wherein the step of heat treatment comprises placing the glass substrates coated with the liquid organic based solution in a furnace for heating.
6. The method according to claim 5, wherein the heating is at a temperature of 425° C.
7. The method according to claim 1, wherein said step of heat treatment is conducted in air.
8. The method according to claim 1, wherein said step of heat treatment is conducted in an inert gas environment.
9. The method according to claim 8, wherein the inert gas comprises nitrogen, argon or neon.
10. The method according to claim 1, wherein the material of said glass substrate comprises quartz, boron glass, sodium glass, or other glass material.
11. A method for modifying the surface of glass substrates, consisting essentially of the following steps:
    filling a liquid organic-based solution in glass microchannels, said liquid organic-based solution is selected from the group consisting of siloxane and silsesquioxane;
    removing the superfluous organic-based liquid; and,
    applying heat treatment to the glass microchannels coated with the organic-based solution to cross-link the liquid materials,
    wherein said liquid organic-based solution after the heat treatment isolates Si—OH groups on the surface of glass substrates from the environment to restrain the occurrence of electro-osmotic flow.
12. The method according to claim 11, wherein said liquid organic-based solution is an organic-based spin-on-glass.
13. The method according to claim 12, wherein said organic-based spin-on-glass has two side-linked functional groups $R_1$ and $R_2$ after cross-linking and solidification.
14. The method according to claim 13, wherein $R_1$ and $R_2$ are independently selected from the group consisting of the functional groups H, $CH_3$, $CH_3CH_2$, $CH_3CH_2CH_2$, $C_6H_5$, $CF_3CH_2CH_2$, and other derivative organic functional groups.
15. The method according to claim 11, wherein the step of heat treatment comprises placing the glass substrate coated with organic-based liquid in a furnace for heating.
16. The method according to claim 15, wherein the heating temperature is at 425° C.
17. The method according to claim 11, wherein said step of heat treatment is conducted in air.
18. The method according to claim 11, wherein said step of heat treatment is conducted in an inert gas environment.
19. The method according to claim 18, wherein the inert gas comprises nitrogen, argon, or neon.
20. The method according to claim 11, wherein the material of said glass microchannels comprises quartz, boron glass, sodium glass, or other glass material.

* * * * *